(12) United States Patent
Bryan et al.

(10) Patent No.: US 11,243,872 B2
(45) Date of Patent: Feb. 8, 2022

(54) GENERATING AND AGGREGATING TEST RESULT DATA OF A DISTRIBUTED SYSTEM OF DEVICES INTO A TEST CASE RESULT FOR FACILITATING ACCESS OF THE TEST CASE RESULT VIA A SINGLE ITERATOR

(71) Applicant: EMC IP Holding Company LLC, Hopkinton, MA (US)

(72) Inventors: Matthew Bryan, Olympia, WA (US); Henry Courtlandt Van Voorhis, II, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 30 days.

(21) Appl. No.: 16/917,516

(22) Filed: Jun. 30, 2020

(65) Prior Publication Data
US 2021/0406156 A1 Dec. 30, 2021

(51) Int. Cl.
| | | |
|---|---|---|
| G06F 11/36 | (2006.01) | |
| G06F 11/30 | (2006.01) | |
| G06F 11/32 | (2006.01) | |

(52) U.S. Cl.
CPC ...... *G06F 11/3684* (2013.01); *G06F 11/3082* (2013.01); *G06F 11/328* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 7,730,452 B1* | 6/2010 | Li | ............. | G06F 9/449 717/124 |
| 8,856,743 B2* | 10/2014 | Sweis | ............. | G06F 11/3608 717/124 |
| 9,811,451 B1* | 11/2017 | Arguelles | ............. | G06F 11/3688 |
| 10,599,559 B2* | 3/2020 | Dain | ............. | G06F 11/3688 |
| 2005/0034103 A1* | 2/2005 | Volkov | ............. | G06F 11/3664 717/124 |

(Continued)

OTHER PUBLICATIONS

Hanawa, "Large-Scale Software Testing Environment using Cloud Computing Technology for Dependable Parallel and Distributed Systems", 2010, IEEE (Year: 2010).*

*Primary Examiner* — Hossain M Morshed
(74) *Attorney, Agent, or Firm* — Amin, Turocy & Watson, LLP

(57) ABSTRACT

Generating and aggregating test result data of a distributed system of devices into a test case result for facilitating access of the test case result via a single iterator is presented herein. A coordinator component of the distributed system of devices creates respective context identifiers for each unique phase of a test case of the distributed system of devices, and sends messages including the respective context identifiers to a producer component of the distributed system of devices. In this regard, the producer component includes producers having respective services executing processes corresponding to an execution of the test case. The messages instruct the respective services to associate the respective context identifiers with events representing result data of the processes, and the respective context identifiers facilitate respective accesses of the events representing the result data of the processes.

20 Claims, 11 Drawing Sheets

(56) References Cited

U.S. PATENT DOCUMENTS

| | | | | |
|---|---|---|---|---|
| 2005/0114737 A1* | 5/2005 | Hughes | ............... | G06F 11/3688 |
| | | | | 714/38.1 |
| 2007/0277154 A1* | 11/2007 | Badwe | ................ | G06F 11/3688 |
| | | | | 717/124 |
| 2018/0121339 A1* | 5/2018 | Mayers | ............... | G06F 11/3688 |

* cited by examiner

GENERATING AND AGGREGATING TEST RESULT DATA OF A DISTRIBUTED SYSTEM OF DEVICES INTO A TEST CASE RESULT FOR FACILITATING ACCESS OF THE TEST CASE RESULT VIA A SINGLE ITERATOR

TECHNICAL FIELD

The subject disclosure generally relates to embodiments for generating and aggregating test result data of a distributed system of devices into a test case result for facilitating access of the test case result via a single iterator.

BACKGROUND

Conventional testing technologies face challenges when managing test results of distributed systems, e.g., such systems having a network of computing devices that process, communicate, coordinate, etc. respective actions with other computing devices to achieve a common goal, e.g., storage, computation, etc. In this regard, obtaining portion(s) of test result data that are relevant to a specific failure of a distributed system of devices is arduous and/or unattainable since test results of tests running in parallel across multiple machines of the distributed system are reported in separate test logs spread across the multiple machines, and not all logs are relevant for all failures. Consequently, conventional testing technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
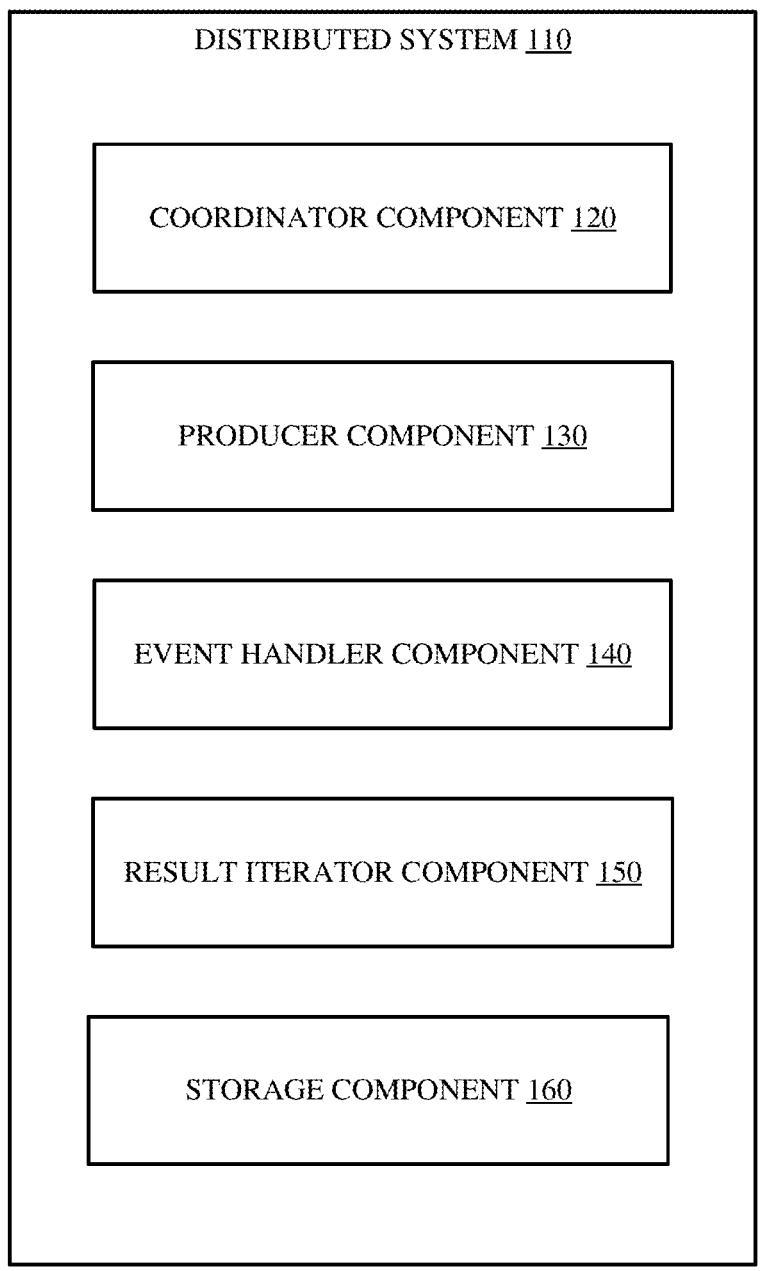
FIG. 1 illustrates a block diagram of a distributed system comprising a coordinator component, producer component, event handler component, and result iterator component for generating and aggregating test result data of such system into a test case result for facilitating access of the test case result via a single iterator, in accordance with various example embodiments.
Figure 2:
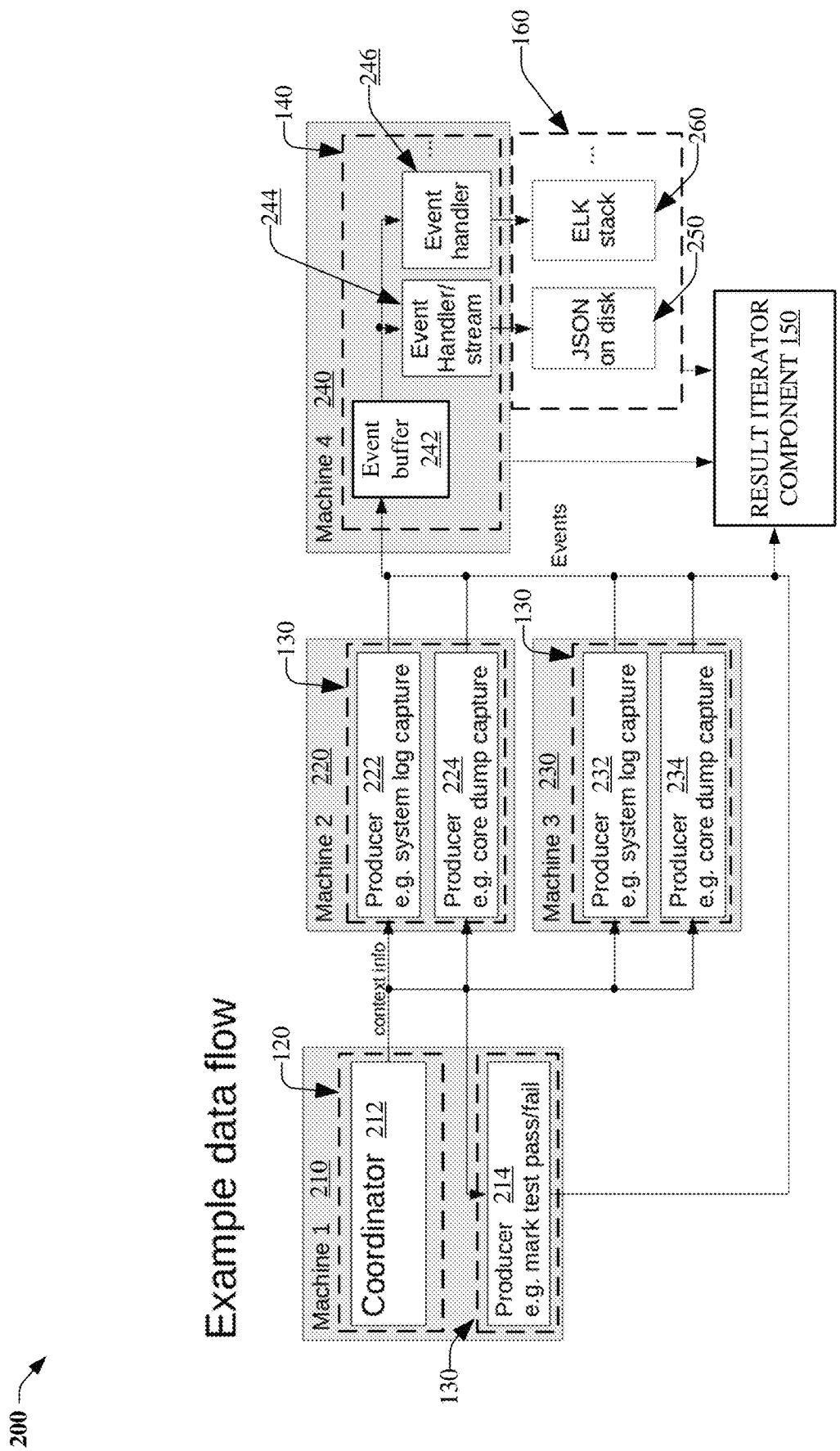
FIG. 2 illustrates a block diagram of a data flow for generating and aggregating test result data of a distributed system into a test case result for facilitating access of the test case result via a single iterator, in accordance with various example embodiments.
Figure 3:
FIG. 3 illustrates a block diagram of a data stream comprising a serialized and persistently-stored collection of events related to a given test run, in accordance with various example embodiments.
Figure 4:
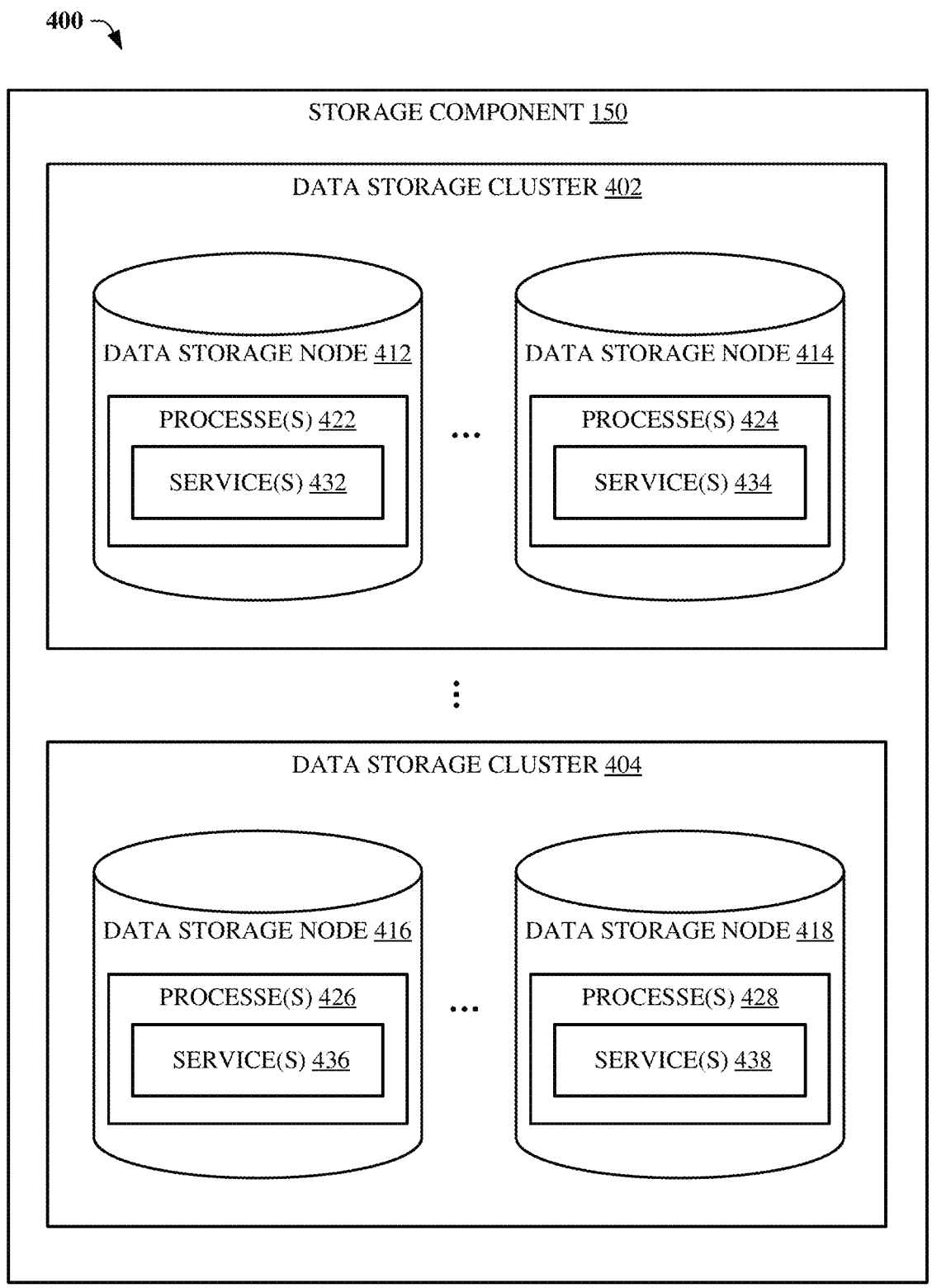
FIG. 4 illustrates a storage component of a distributed storage system for facilitating access of the test case result via a single iterator, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional testing technologies have faced a number of challenges with respect to managing, investigating, etc. test results of a distributed system. For example, output data of a test case of the distributed system is spread across system logs of each device of the system, and test data that is relevant to the test case may not be represented by every system log; therefore, it is often necessary to manually consult many, if not all, of the system logs to investigate a test result—resulting in excessive time and effort to sort through and compile test results of the test case.

On the other hand, various embodiments disclosed herein can facilitate singular access of different phases of a test case of a system by assigning a unique context identification (ID) to each of the different phases of the test case, and associating the unique context ID with events representing result data of a phase of the test case—the events aggregated across multiple machines of the system—to facilitate the singular access, iterative access, etc. of the events using the unique context ID.

For example, a system, e.g., a distributed system of devices, comprises a processor; and a memory that stores executable components that, when executed by the processor, facilitate performance of operations by the system. In this regard, the executable components comprise a coordinator component, coordinator, etc. and a producer component.

The coordinator component creates respective context identifiers for each unique phase, e.g., set up phase, tear down phase, etc., of a test case of the system. Further, the coordinator component sends messages comprising the respective context identifiers to the producer component, which comprises respective producers that have been installed on the devices and execute respective services comprising processes corresponding to an execution of the test case. In this regard, the messages instruct the respective services to associate the respective context identifiers with events representing result data of the processes—the respective context identifiers facilitating respective accesses of the events representing the result data of the processes.

In an embodiment, the coordinator component, coordinator, etc. nests context identifiers to obtain nested context identifiers representing respective subtests of the unique phase of the test case to facilitate respective accesses of respective groups of events of the events comprising respective portions of the result data for the respective subtests of the unique phase of the test case.

In another embodiment, the producer component, producers, etc. assign defined event types to the events, in which a defined event type of the defined event types comprises a metadata record comprising a context ID of the respective context identifiers corresponding to a portion of the result data, a timestamp representing when a unit of the portion of the result data has been produced via a process of the processes, and information representing the unit of the portion of the result data.

In an embodiment, the information representing the unit comprises text representing whether the test case has passed or failed. In another, embodiment, the unit comprises unstructured data, e.g., a core dump, that has been generated via a failure corresponding to at least one of the system, the service, or the process. In yet another embodiment, the information representing the unit comprises a uniform resource indicator (URI) referencing the unstructured data.

In one embodiment, an event handler component, event hander, etc. of the system generates, based on the unit of the portion of the result data, a modified unit of result data, e.g., a javascript object notation (JSON) encoded array of dictionaries or extensible markup language (XML). In another embodiment, the event handler can display, using hypertext markup language (HTML) via a display device of the system, the modified result data.

In another embodiment, a result iterator component, result iterator, etc. of the system aggregates, serializes, etc., in chronological order, a group of events of the events comprising the context ID into an aggregated, serialized, etc. event stream representing portions of the result data corresponding to the unique phase of the test case.

In yet another embodiment, a method comprises: assigning, by a system comprising a processor, respective contextual information comprising respective global test identifications to distinct test phases of a test run; initiating, by the system, an execution of the distinct test phases across a group of devices of the system; and in response to initiating the execution of the distinct test phases across the group of devices, generating, by the system based on the respective contextual information via the group of devices, a group of events representing test results of the test run to facilitate, using the respective global test identifications, respective accesses of the group of events representing the test results of the test run.

In an embodiment, initiating the execution of the distinct test phases comprises: based on respective messages, application programming interface calls, etc. that comprise the respective contextual information and that initiate execution of the distinct test phases, performing, by the system based on the respective contextual information, the execution of the distinct test phases across the group of devices.

In one embodiment, generating the events comprises: based on the respective context information, assigning respective event types to the events. In this regard, an event type of the respective event types that has been assigned to an event of the events corresponding to a test case of the distinct test phases comprises a global test identification of the respective global test identifications, a timestamp representing when a unit of the test results corresponding to the test case has been produced, and information representing the unit of the test results.

In another embodiment, the method further comprises: generating, by the system based on the unit, a modified unit of test results.

In yet another embodiment, the method further comprises: displaying, by the system via a display device, a core dump corresponding to test results, a system log corresponding to the test results, and/or text corresponding to the test results.

In an embodiment, the method further comprises: selecting, by the system, events of the group of events comprising a global test identification of the global test identifications corresponding to a test case of the distinct test phases of the test run; sorting, by the system, the events in chronological order to obtain an ordered stream of events of the test case; and storing, by the system, the stream of events in a storage device of the system to facilitate, based on the global test identification, a display of the ordered stream of events of the test case.

In one embodiment, a non-transitory machine-readable medium comprises instructions that, in response to execution, cause a system comprising a processor to perform operations, comprising: assigning respective context identifiers to respective phases of a test case of the system, and sending messages comprising the respective context identifiers to respective services corresponding to processes for execution of the test case. In this regard, the messages direct the respective services to associate the respective context identifiers with events representing result data of the processes, and the respective context identifiers facilitate respective accesses of the events representing the result data of the processes.

In another embodiment, the operations further comprise: storing the events in a storage device of the system to facilitate, using the respective context identifiers, the respective accesses of the events.

In yet another embodiment, the operations further comprise: in response to selecting, from the events, a group of events comprising a context identifier of the respective context identifiers that has been assigned to a phase of the respective phases of the test case, generating an event stream comprising the group of events to facilitate a display of the event stream via a display device of the system.

Referring to FIG. 1, a block diagram of a distributed system (110) comprising a coordinator component (120), a producer component (130), an event handler component (140), a result iterator component (150), and a storage component (160) for generating and aggregating test result data of such system into a test case result for facilitating access of the test case result via a single iterator is illustrated, in accordance with various example embodiments. In this regard, the distributed system can comprise a distributed file system, an ECS system, a parallel distributed networked file system, a OneFS™ file system provided by Dell EMC® Isilon Systems (e.g., utilizing a FreeBSD based operating system), etc. In various embodiment(s), the distributed file system can comprise a host server, a client server, etc. (not shown). In other embodiment(s), various components of the distributed file system can be included in a host application, a client application, storage/data services, etc.

Figure 10:
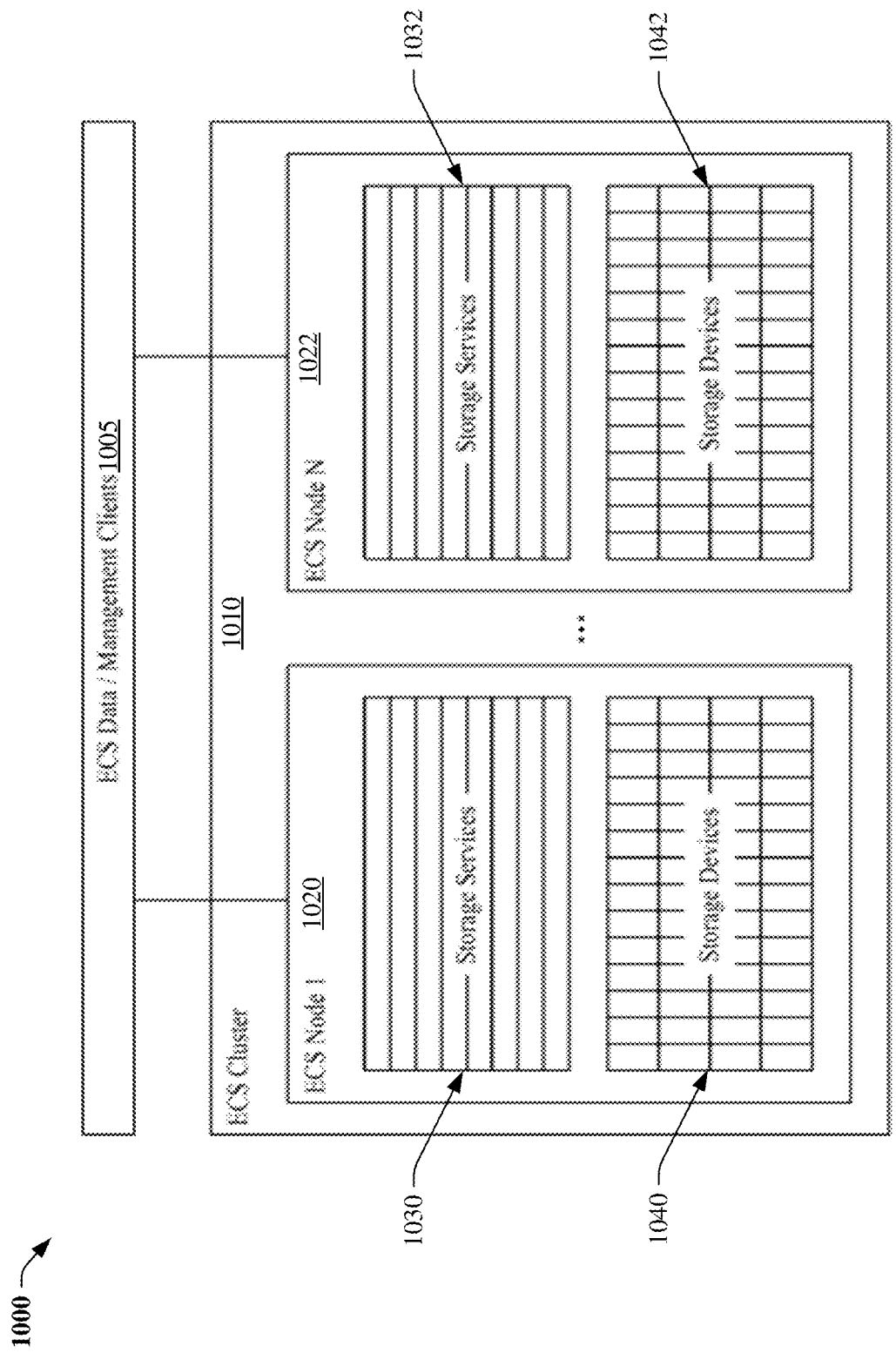
FIG. 10 illustrates a block diagram of an elastic cloud storage (ECS) system, in accordance with various example embodiments.

As illustrated by FIG. 10, an ECS system (1000) can comprise a cloud-based object storage appliance (e.g., comprising storage control software, components; ECS data clients/management clients (1005); storage services (1030, 1032) and storage devices (1040, 1042) (e.g., comprising storage media, physical magnetic disk media, solid-state drive (SSD) media, e.g., flash storage, etc.) of a storage cluster (1010). In this regard, the cloud-based object storage appliance is a type of clustered file system that spreads data across multiple storage nodes (1020, 1022), e.g., usually for redundancy or performance. Further, such clustered file system can simultaneously be mounted on multiple file servers (not shown), e.g., OneFS™ clusters, and can provide features like location-independent addressing and redundancy which can improve reliability and/or reduce the complexity of portion(s) of the storage cluster, e.g., data storage cluster, data cluster, etc.

Storage services (1030, 1032) and storage devices (1040, 1042) can be included in respective data storage nodes (1020, 1022) of storage clusters, e.g., combined as an integrated system—with no access to the storage devices other than through the ECS system. In this regard, the respective nodes, storage nodes, data storage nodes, etc. can be communicatively and/or operatively coupled to each other, with the storage service(s) comprising respective processes, processing jobs, job worker processes, applications, etc. that can be utilized to service user requests according to user-based storage policies.

In general, the respective data storage nodes can communicate with user devices via wired and/or wireless communication network(s) to provide access to services that are based in the cloud and not stored locally (e.g., on a user device). A typical cloud-computing environment can include multiple layers, aggregated together, which interact with each other to provide resources for end-users.

The ECS system can support storage, manipulation, and/or analysis of unstructured data on a massive scale on commodity hardware. As an example, the ECS system can support mobile, cloud, big data, and/or social networking applications. In another example, the ECS system can be deployed as a turnkey storage appliance, or as a software product that can be installed on a set of qualified commodity servers and disks, e.g., within a node, data storage node, ECS node, etc. of a cluster, data storage cluster, ECS cluster, etc. In this regard, the ECS system can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the ECS system can write all object-related data, e.g., user data, metadata, object location data, etc. to logical containers, e.g., buckets, etc. of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed and/or closed—becoming immutable, e.g., read-only and delete only.

Further, a storage node (1020, 1022) of the storage cluster can comprise a system (110), a server, a file system, an image of the OS, data service(s), computer processing unit(s) (CPU(s)), storage devices (e.g., non-volatile memory devices, disk drives, solid-state drives, etc.), memory devices (e.g., volatile memory devices, random access memory), etc.

Now referring to FIGS. 3-6, the following description describes various features and embodiments of distributed system 110:

There are many 'topologies' of components described herein that are possible. That is—the number and types of each component, how they communicate, whether they are running in the same process and/or by the same thread of execution, etc. Components of the solution are as follows:

Coordinator

In embodiment(s), the coordinator, coordinator component (120), etc. comprises a piece of code running in a test process that is in charge of coordinating the mechanics of the rest of this solution. It also implements the API for the solution. Typically, it is a piece of code that will be called into by a test framework, runner service, etc. For example, we may use Python's pytest plugin interface to call into it, e.g. calling a certain method to mark the start of a run of a test case. It could, however, be running in a separate daemon that a test, phase of a test, test case, etc. communicates with through some interprocess communication (IPC) mechanism.

The coordinator uses calls into its API to communicate to the other parts (e.g., see producer component, producers, etc. described below) of the system with respect to how they should produce and store the results data. It establishes a globally unique ID for each phase of a test run, e.g., the phases being individual runs of individual test cases, e.g., comprising set up and tear down steps, etc. Such globally unique IDs are referred to as "contexts", contextual information, context IDs, etc. herein. The coordinator communicates this contextual information so that the rest of the system can properly "contextualize" the data it produces. That contextualization is how we associate data with a given test later.

Figure 6:
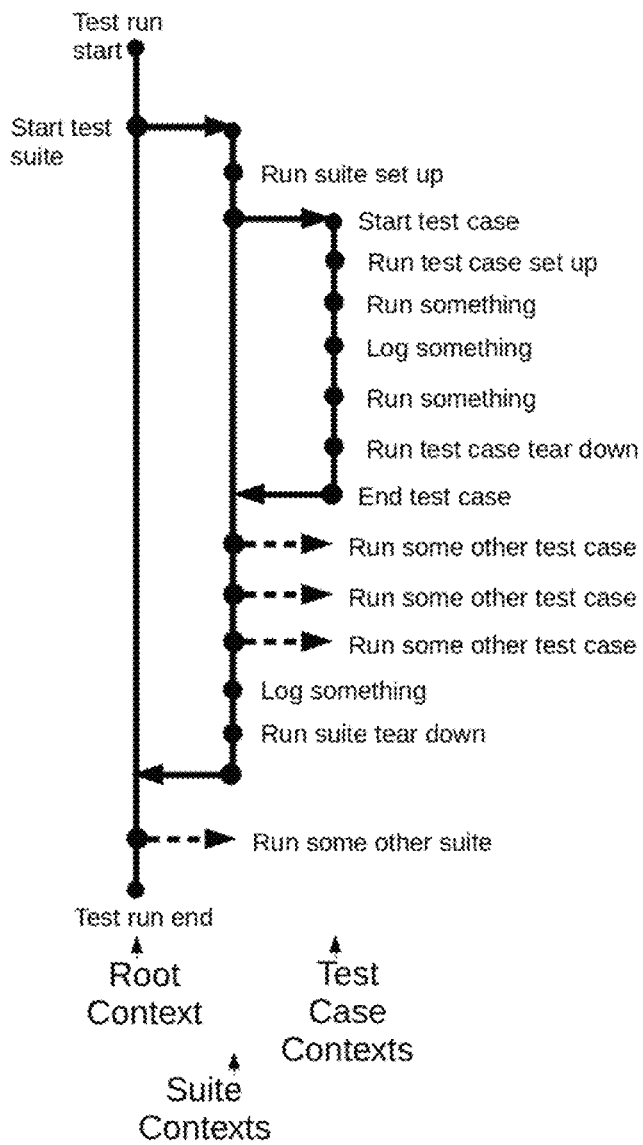
FIG. 6 illustrate a block diagram of a logical flow of test case contexts, in accordance with various example embodiments.

FIG. 6. illustrates a context flow as a context tree that, in embodiment(s), can be represented by some means, e.g., display device, via the coordinator. The coordinator is responsible for communicating this contextual information to the parts of the system that are producing test results data. What specifically is communicated there depends on the logic of the test. As illustrated by FIG. 6, in embodiment(s), the coordinator nests context identifiers (IDs) to obtain nested context IDs representing respective subtests of the phase, e.g., setup, tear down, etc. of a test case.

Producers

Producers (214, 222, 224, 232, 234), e.g., of the producer component (130), collect and produce a record of test results data. They can run in the same process as the coordinator or as separate process(es), e.g., on separate machines (210, 220, 230, 240), devices, etc. of the distributed system (110). The individual quanta of results data will be referred to as "events" here (see, e.g., 310, 320, 330, 340, 350). Each event is marked with the ID of the context to which it belongs, and each event belongs to exactly one context.

The context that a producer marks on an event depends on the logic of the test. Often, this will simply be "the current context", or the context of the running test. A producer communicates the events it produces to an event handler, event handler component (140), etc., or to a buffer of events, event buffer (242), etc.

Event Handlers

Event handlers (244, 246), e.g., of the event handler component (140) receive events and format them for storage, or some sort of presentation of the results data, such as:

producing an HTML view of a run of tests, stashing textual data (e.g., stdout, syslogs) in Elasticsearch for later analysis, and/or producing some sort of standard test output format like JUnit XML.

Events can be received directly from producers, or from a flush of some buffer of events (242) that were previously enqueued in the buffer by a producer. There can be multiple producers sending events to a given handler, event handler (246), etc. There can be multiple handlers associated with a given test run. As before, in general, a producer, coordinator, and/or handler can all run inside the same process, possibly even the same thread.

Event Buffer(s) and Multiplexers

Events can be buffered for some time so that they can be sent to event handler(s), e.g., as some sort of group of events. Buffering and flushing in groups is just used for the purpose of managing performance. For example, it is usually more efficient to write many events worth of data to disk in a single write than to write them individually.

Multiplexing can also be used here in the sense that we may flush a given event or group of events to multiple event handlers. This is typically done in order to persist data, or present multiple views of the data. For example, we may both produce an HTML page of results, as well as stash some microdata in an Elasticsearch instance.

A Special Event Handler: the Event Stream

Event streams (300) are serialized and persistently-stored collections of events (310, 320, 330, 340, 350) related to a given test run. These are written by a type of event handler that is always present in, corresponding to, etc. a test run. The event handler(s) store the events themselves so that result iterators (explained below) can recreate the exact data that the event handler(s) could have observed earlier. This allows for post-hoc consumption of the data, which is a common way of creating the results views that the event handler(s) generated. Such post-hoc processing avoids using the same system resources as the test itself, which is a common concern in practice.

The event stream and the storage technology work in conjunction to ensure data consistency, e.g., through locking. In general, there is no ordering of events enforced within a stream, though a given embodiment of this method may include some ordering constraints. As before, multiple producers can send events to a given event stream, possibly in parallel. There can also be multiple event streams for a given test run.

In embodiment(s), event streams are JSON-encoded arrays of dictionaries stored to a filesystem (e.g., JSON on disk (250)) outside an Isilon cluster being tested. In order to avoid losing generality, event streams are not bound, however, to a specific serialization format or storage technology. In embodiment(s), events can be stored as XML; as some binary format; in a document store such as Elasticsearch, e.g., via an Elasticsearch host (550); an Elasticsearch, Logstash, and Kibana (ELK) stack (260), etc.

In practice, the storage format is usually append-able. That is, the format allows for appending of additional events without having to read any of the events previously appended to the stream—facilitating appending of events via large-scale, e.g., parallel, test runs, processes, etc. This makes it more practical for many processes to contribute to the event stream without the overhead of reading all the stream's prior contents. Further, having to read all the prior contents may be prohibitive overhead in practice when running thousands of tests, particularly if each test is run in an isolated process.

Result Iterator

A result iterator, e.g., of the result iterator component (150), comprises data stream ingestion code, process(es), etc. used to present a view of all data for a given test result and from across all event streams to which it was written. A "test result" can refer to a single run of a single test case, all results for a given suite of test cases, all suites in a given test run, etc. The events that describe a test result can be spread across many streams. Further, the URIs for these streams are provided to the result iterator.

In embodiment(s), there are two types of iterators:
   iterator(s) that simply provide one event on each iteration, such event drawn, obtained, etc. from all event streams corresponding to the given test run; these can be used for post-hoc processing of the raw events, as alluded to above; and
   iterator(s) that provide some summarized unit of test results data, such as providing a single test case's data on an iteration.

In the latter case, each iteration of the result iterator presents a collection of data that holds all the individual portions of data for a single test result. For example, on a given iteration, the result iterator can provide all results data for a single run of a single test case, e.g., timestamps, pass/fail disposition, stdout, core dumps, etc. The iterator, e.g., context ID, is used to iterate over all of the individual portions of the data, collection of data, etc. for the single test case result. In embodiment(s), the collection of data comprises a set of key/value pairs assembled using event type information.

A Set of Event "Types"

The "type" of an event represents type information that describes what data the event will provide, and how the data should be interpreted later by an event handler, by a user of the results iterator, e.g., via a display device corresponding to the result iterator, etc. Every event type includes a context ID. In embodiment(s), an event can represent a process core dump, in which case the event can include fields comprising: a URI referring to the core dump; a timestamp that the core dump was generated; some data representing a process that has generated the core dump and where the process was running, executing, etc.; and the context ID of the test case run that likely precipitated, caused, etc. the core dump. In this regard, the type of the event enumerates those fields and how they can be interpreted later.

In embodiment(s), a process, e.g., of the result iterator component, that ingests, receives, etc. the events can utilize the event type information when determining how best to display corresponding result data, e.g., for an HTML view corresponding to a process core dump event, a link can be provided, along with metadata about the process. In embodiment(s), when generating JUnit XML data, an event can be ignored since an event type of the event indicates data that isn't easily shoe-horned into Junit XML format.

In embodiment(s), an external storage device (e.g., of storage component 160), can be used to persist test artifacts of respective events. In this regard, the test artifacts comprise units of data that can help with investigating a test result, such as:
   filtered and sliced system logs,
   process core dumps, and/or
   recorded sysctl values or other system config information.

A producer, producer component, etc. is responsible for persisting the artifact in conjunction with the external storage device, e.g., recording an appropriate URI for the test artifact in an event.

Figure 5:
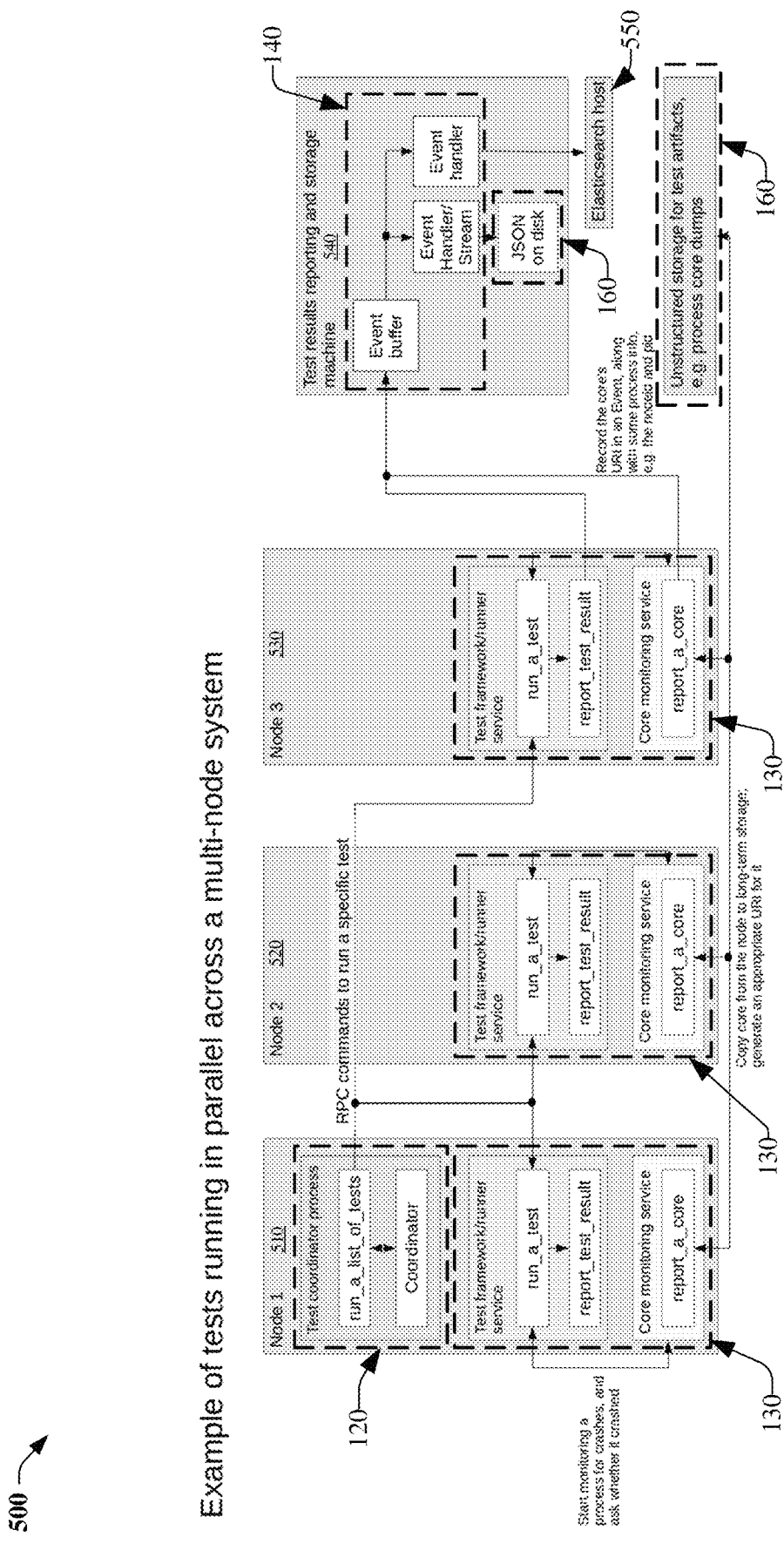
FIG. 5 illustrates a block diagram of a group of tests of a test case running in parallel across a multi-node system, in accordance with various example embodiments.

Referring now to FIG. 5, a block diagram of a group of tests of a test case running in parallel across a distributed system (e.g., 110) comprising three nodes (510, 520, 530) is illustrated, in accordance with various example embodiments. As illustrated by FIG. 5, each test that is running, executing, etc. in parallel (e.g., "run_a_test") corresponds to different daemons that have instances running on each node. On node 1 (510) we have a single process (test coordinator process) in charge of starting the tests running, with respective test coordinator processes running, initiating execution of, etc. test 1 on node 1 and test 2 on node 2. Further, a machine (540) is responsible for logging test events, with all the test-related processes, e.g., "report_test_result", "report_a_core", sending data, based on an IP address and port number of the machine and via an event buffer, to the machine. Sample pseudocode 1 below represents at least a portion of the above steps:

---
Sample Pseuodocode 1.
---

```
# This is pseudocode for test 1, which is running in the test executor
# on node 1
def test1(self, context_id):
    for node in ['node1', 'node2', 'node3']:
        core_monitor.monitor_process('somedaemonD', node, context_id)
    <the actual test>
    the_process_cored = False
    for node in ['node1', 'node2', 'node3']:
        the_process_cored = the_process_cored or core_monitor.
            finish_monitoring('somedaemonD', node)
    if the_process_cored:
        test_framework.test_failed(context_id)
    else:
        test_framework.test_passed(context_id)
```

For example, assume one of the checks that the test does is for core dumps of the daemon it is testing. If the daemon crashes, such crash is considered a test failure. Further, assume that we have some sort of service used by tests to monitor for core dump(s), and to report back if a core dump has occurred. If a core dump did occur, the service will copy the core dump off the to an external storage device and generate an event containing a URI referencing the core dump. Sample pseudocode 2 below represents at least a portion of the above steps:

---
Sample Pseudocode 2.
---

```
# Indicate to the coordinator that we are going to run a test.
context_id1 = coordinator.start_test( )
# Now we actually trigger the test running on a node.

# We have some sort of e.g. RPC mechanism to trigger a test of a given
# name running on one of our nodes. That remote runner will be
# responsible for finding the test of that name, and reporting all the
# results of the test. We pass the context_id to which it should report.

#That framework will produce a StartTestCaseEvent in that context to
#indicate what test is running and where
test_framework.run_a_test_on('node1','test1', context_id1)
# Now suppose we have another test running on another node, in parallel
# to the first
context_id2 = coordinator.start test( )
test_framework.run_a_test_on('node2', 'test2', context_id2)
```

The test framework is instrumented, setup, etc. to generate events for test pass or fail, and an event corresponding to the end of the test case run. Sample pseudocode 3 below represents a producer function, process, etc. that is used to record a test failure:

---
Sample Pseudocode 3.
---

```
# This is the function in the test framework that is called to record that the
# test failed. It is in-fact Producer code.

# Let's say that we send Events to some 'self.report_event' method that
# takes care of making sure the Event is sent to the test event machine
def test_ failed(self, context_id):
    self.report_test_result(passed=False, context_id)
def report_test_result(self, passed, context_id)
    # We mark timestamps to the current time, but another possible use
case
    # is that we ingest results from some tool that
    # already ran the tests. Since we are then producing these events post-
    # hoc, we would mark the time to the time that the test actually fin-
ished.
    result_event = TestCaseResultEvent(context_id=context_id,
passed=passed,
        time=now)
    self.report_event(result_event)
    test_finished_event = EndTestCase(context_id=context_id, time=now)
    self.report_event(test_finished_event)
```

Figure 7:
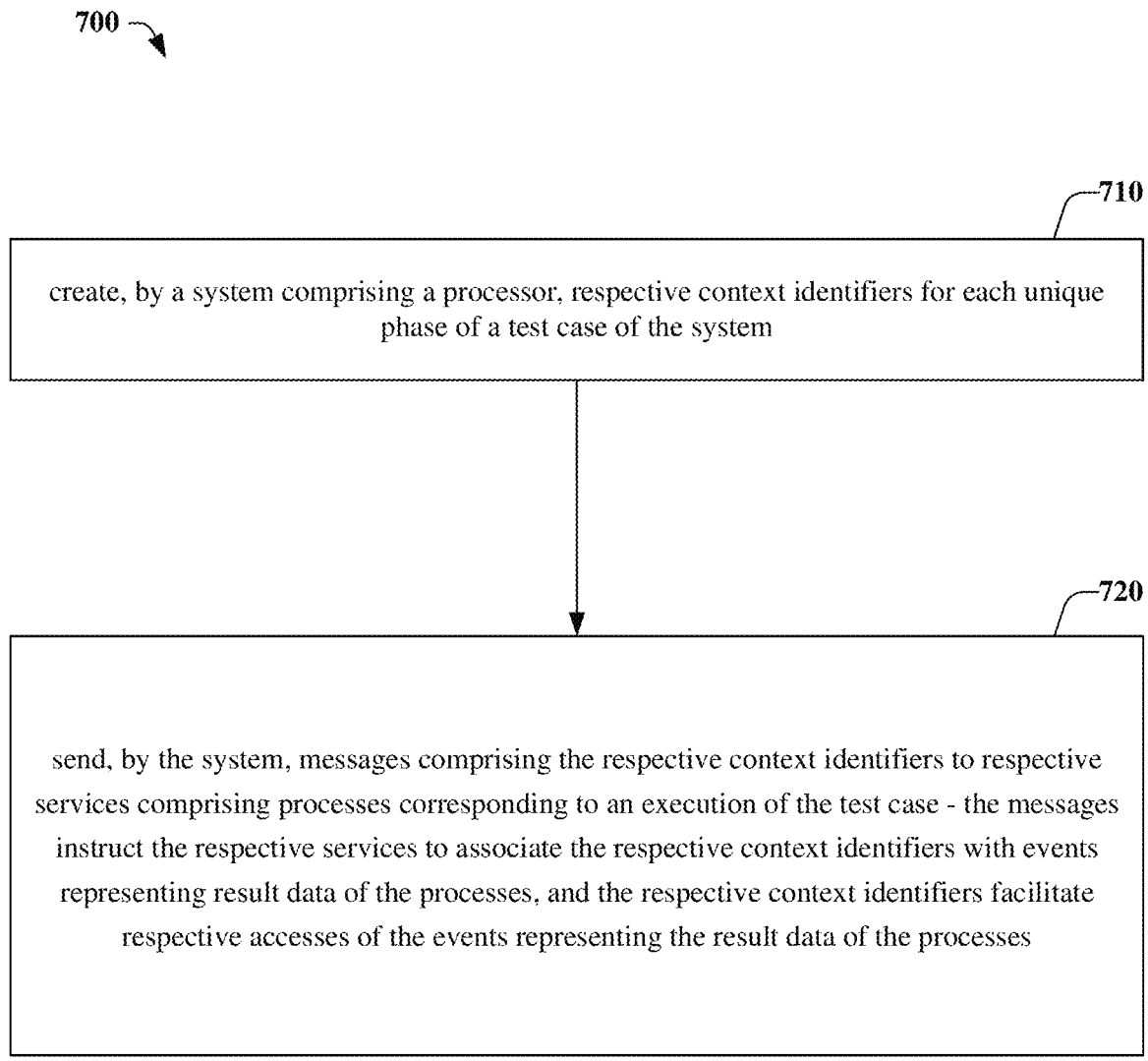
FIG. 7 illustrated a flow chart of a method associated with generation and aggregation of test result data of a distributed system of devices into a test case result for facilitating access of the test case result via a single iterator, in accordance with various example embodiments.
Figure 8:
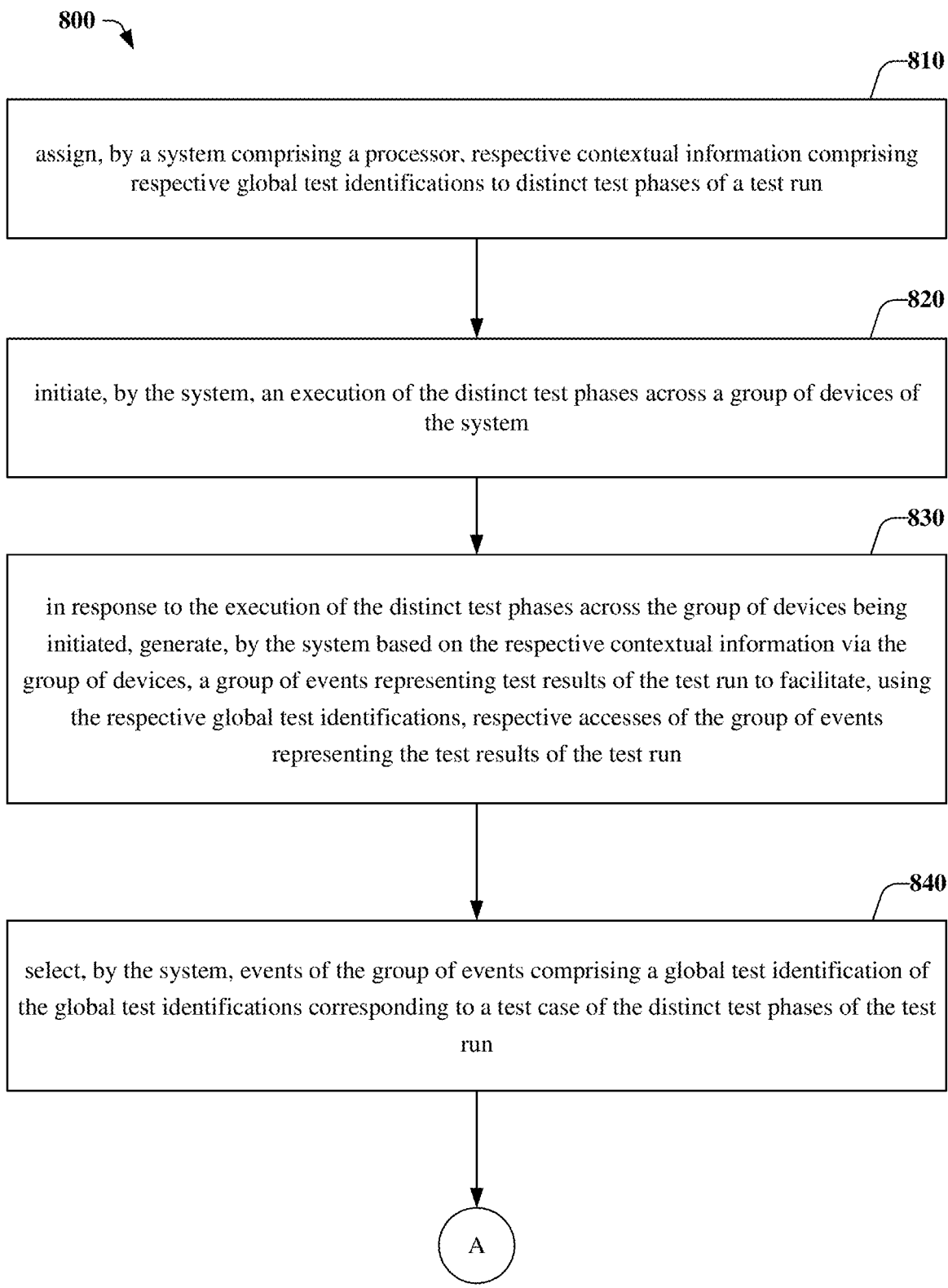
FIGS. 8-9 illustrate flow charts of another method associated with generation and aggregation of test result data of a distributed system of devices into a test case result for facilitating access of the test case result via a single iterator, in accordance with various example embodiments.
Figure 9:
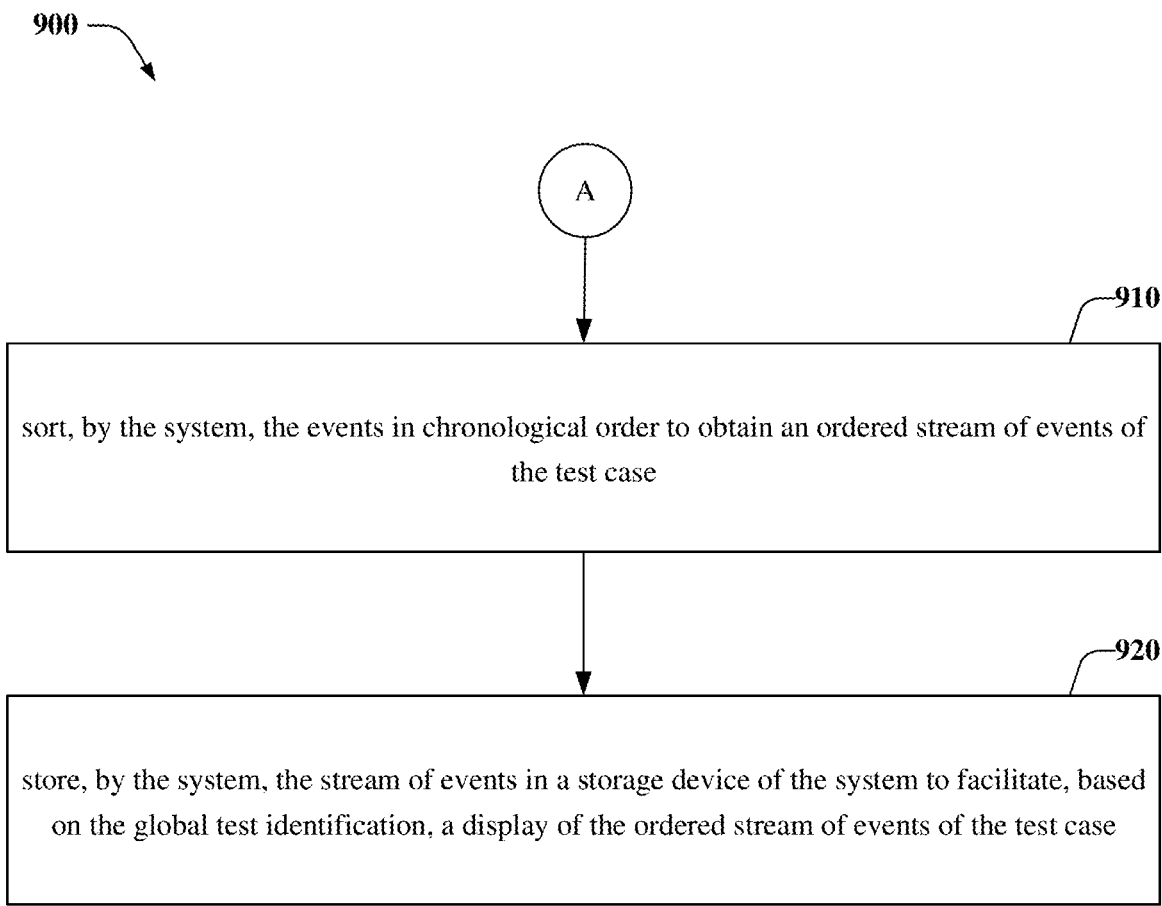

FIGS. 7-9 illustrate methodologies associated with generation and aggregation of test result data of a distributed system (110) of devices into a test case result for facilitating access of the test case result via a single iterator, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, a flow chart (700) of a method associated with generation and aggregation of test result data of a distributed system of devices into a test case result for facilitating access of the test case result via a single iterator is illustrated, in accordance with various example embodiments. At 710, a system (110) comprising a processor creates respective context identifiers for each unique phase of a test case of the system.

At 720, the system sends messages comprising the respective context identifiers to respective services comprising processes corresponding to an execution of the test case. In this regard, the messages instruct the respective services to associate the respective context identifiers with events representing result data of the processes, and the respective context identifiers facilitate respective accesses of the events representing the result data of the processes.

FIGS. 8-9 illustrate flow charts (800 and 900) of a method associated with generation and aggregation of test result data of a distributed system of devices into a test case result for facilitating access of the test case result via a single iterator is illustrated, in accordance with various example embodiments. At 810, a system (110) comprising a processor assigns respective contextual information comprising respective global test identifications to distinct test phases of a test run.

At 820, the system initiates an execution of the distinct test phases across a group of devices of the system.

At 830, in response to the execution of the distinct test phases across the group of devices being initiated, the system generates, based on the respective contextual information via the group of devices, a group of events representing test results of the test run to facilitate, using the respective global test identifications, respective accesses of the group of events representing the test results of the test run.

At 840, the system selects events of the group of events comprising a global test identification of the global test identifications corresponding to a test case of the distinct test phases of the test run.

At 910, the system sorts the events in chronological order to obtain an ordered stream of events of the test case. At 920, the system stores the stream of events in a storage device of the system to facilitate, based on the global test identification, a display of the ordered stream of events of the test case.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store", "data storage", "storage device", "storage medium", "data storage node", "storage component" and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a node, a storage node, a data storage node, etc. (e.g., 412, 414, 416, 418, 510, 520, 530, 1020, 1022), storage devices (e.g., 250, 260, 1040, 1042), non-volatile memory 1122 (see below), disk storage 1124 (see below), and/or memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1120) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
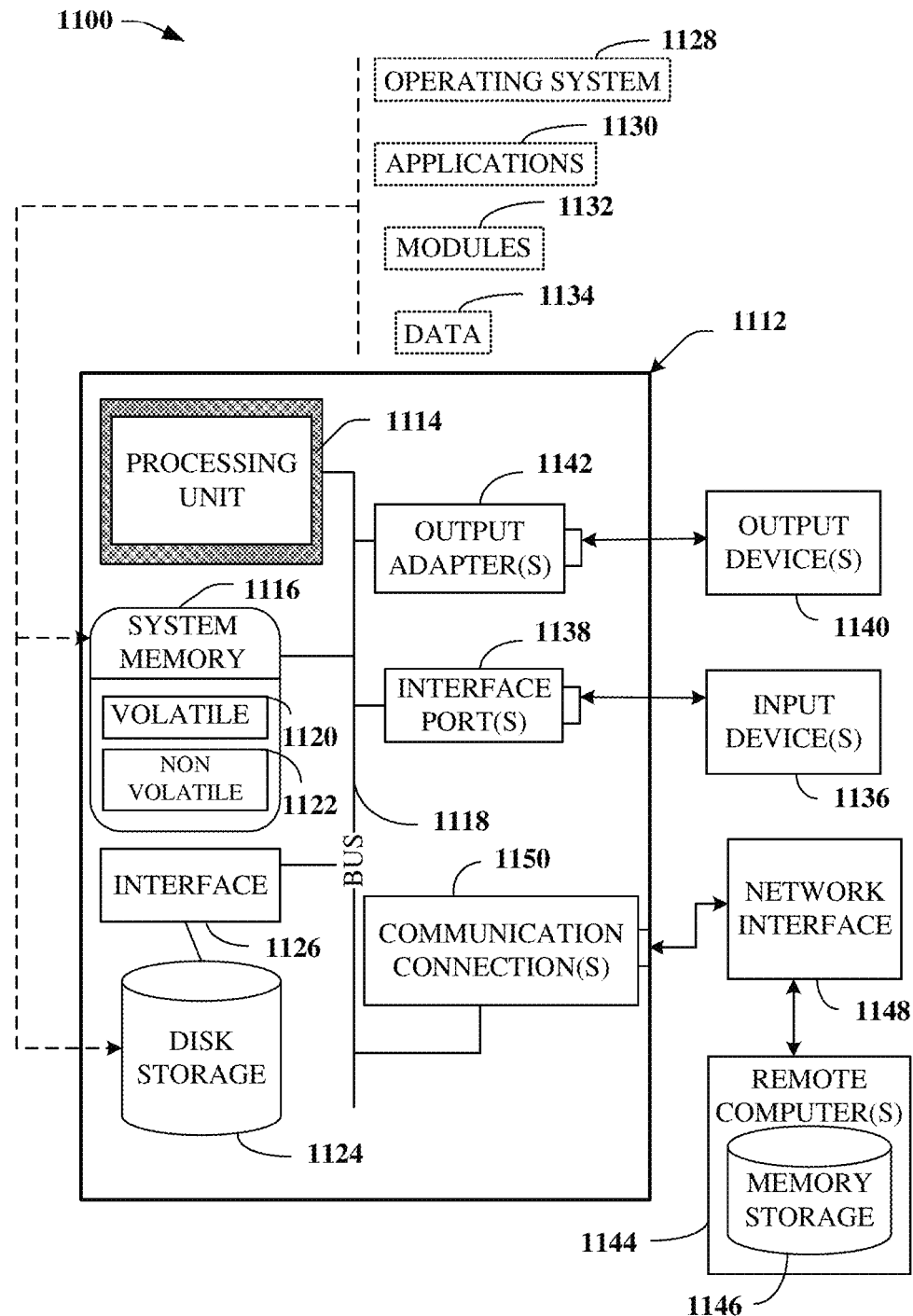
FIG. 11 illustrates a block diagram representing an illustrative non-limiting computing system or operating environment in which one or more aspects of various embodiments described herein can be implemented.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 11, a block diagram of a computing system 1100, e.g., 100, operable to execute the disclosed systems and methods is illustrated, in accordance with an embodiment. Computer 1112 comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150.

Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
  a processor; and
  a memory that stores executable components that, when executed by the processor, facilitate performance of operations by the system, the operations comprising:
    creating respective context identifiers for each unique phase of a test case of the system; and
    sending messages comprising the respective context identifiers to respective services comprising processes corresponding to an execution of the test case, wherein the messages instruct the respective services to associate the respective context identifiers with events representing result data of the processes, and wherein the respective context identifiers facilitate respective accesses of the events representing the result data of the processes.

2. The system of claim 1, wherein the unique phase of the test case comprises at least one of a set up phase or a tear down phase.

3. The system of claim 1, wherein the operations further comprise:
  nesting context identifiers to obtain nested context identifiers representing respective subtests of the unique phase of the test case to facilitate respective accesses of respective groups of events of the events comprising respective portions of the result data for the respective subtests of the unique phase of the test case.

4. The system of claim 1, wherein the operations further comprise:
  assigning defined event types to the events, wherein a defined event type of the defined event types comprises a metadata record comprising a context identifier (ID) of the respective context identifiers corresponding to a portion of the result data, a timestamp representing when a unit of the portion of the result data has been produced via a process of the processes, and information representing the unit of the portion of the result data.

5. The system of claim 4, wherein the information representing the unit comprises text representing whether the test case has passed or failed.

6. The system of claim 4, wherein the unit comprises unstructured data that has been generated via a failure corresponding to at least one of the system, the service, or the process.

7. The system of claim 6, wherein the information representing the unit comprises a uniform resource indicator referencing the unstructured data.

8. The system of claim 6, wherein the unstructured data comprises a core dump.

9. The system of claim 4, wherein the operations further comprise:
  based on the unit of the portion of the result data, generating a modified unit of result data.

10. The system of claim 9, wherein the operations further comprise:
  displaying, using hypertext markup language via a display device of the system, the modified result data.

11. The system of claim 9, wherein the modified result data comprises a javascript object notation encoded array of dictionaries or extensible markup language.

12. The system of claim 4, wherein the operations further comprise:
  aggregating, in chronological order, a group of events of the events comprising the context ID into an aggregated event stream representing portions of the result data corresponding to the unique phase of the test case.

13. A method, comprising:
  assigning, by a system comprising a processor, respective contextual information comprising respective global test identifications to distinct test phases of a test run;
  initiating, by the system, an execution of the distinct test phases across a group of devices of the system; and
  in response to initiating the execution of the distinct test phases across the group of devices, generating, by the system based on the respective contextual information via the group of devices, a group of events representing test results of the test run to facilitate, using the respective global test identifications, respective accesses of the group of events representing the test results of the test run.

14. The method of claim 13, wherein initiating the execution of the distinct test phases comprises:
  based on respective application programming interface calls that comprise the respective contextual information and that initiate execution of the distinct test phases, performing, by the system based on the respective contextual information, the execution of the distinct test phases across the group of devices.

15. The method of claim 13, wherein generating the events comprises:
  based on the respective context information, assigning respective event types to the events, wherein an event type of the respective event types that has been assigned to an event of the events corresponding to a test case of the distinct test phases comprises a global test identification of the respective global test identifications, a timestamp representing when a unit of the test results corresponding to the test case has been produced, and information representing the unit of the test results.

16. The method of claim 15, further comprising:
  generating, by the system based on the unit, a modified unit of test results.

17. The method of claim 13, further comprising:
  displaying, by the system via a display device, at least one of:
    a core dump corresponding to test results,
    a system log corresponding to the test results, or
    text corresponding to the test results.

18. The method of claim 13, further comprising:
  selecting, by the system, events of the group of events comprising a global test identification of the global test identifications corresponding to a test case of the distinct test phases of the test run;
  sorting, by the system, the events in chronological order to obtain an ordered stream of events of the test case; and storing, by the system, the stream of events in a storage device of the system to facilitate, based on the global test identification, a display of the ordered stream of events of the test case.

19. A non-transitory machine-readable medium comprising instructions that, in response to execution, cause a system comprising a processor to perform operations, comprising:

assigning respective context identifiers to respective phases of a test case of the system;

sending messages comprising the respective context identifiers to respective services corresponding to processes for execution of the test case, wherein the messages direct the respective services to associate the respective context identifiers with events representing result data of the processes, and wherein the respective context identifiers facilitate respective accesses of the events representing the result data of the processes; and storing the events in a storage device of the system to facilitate, using the respective context identifiers, the respective accesses of the events.

20. The non-transitory machine-readable medium of claim 19, wherein the operations further comprise:

in response to selecting, from the events, a group of events comprising a context identifier of the respective context identifiers that has been assigned to a phase of the respective phases of the test case, generating an event stream comprising the group of events to facilitate a display of the event stream via a display device of the system.

* * * * *